US005657023A

United States Patent [19]

Lewis et al.

[11] Patent Number: 5,657,023

[45] Date of Patent: Aug. 12, 1997

[54] SELF-PHASE UP OF ARRAY ANTENNAS WITH NON-UNIFORM ELEMENT MUTUAL COUPLING AND ARBITRARY LATTICE ORIENTATION

[75] Inventors: Gib F. Lewis, Manhattan Beach; Eric Boe, Long Beach, both of Calif.

[73] Assignee: Hughes Electronics, Los Angeles, Calif.

[21] Appl. No.: 642,033

[22] Filed: May 2, 1996

[51] Int. Cl.$^6$ ........................................................ G01S 7/40

[52] U.S. Cl. ............................................................. 342/174

[58] Field of Search .................................... 342/174, 372, 342/374, 360

[56] References Cited

U.S. PATENT DOCUMENTS 5,477,229 12/1995 Caille et al. ............................ 342/360

OTHER PUBLICATIONS

Herbert F. Aumann et al., "Phased Array Antenna Calibration and Pattern Prediction Using Mutual Coupling Measurements," IEEE Transactions on Antennas and Propagation, vol. 37, No. 7, Jul. 1989, pp. 844–850.

*Primary Examiner*—Theodore M. Blum

*Attorney, Agent, or Firm*—Leonard A. Alkov; Wanda K. Denson-Low

[57] ABSTRACT

A technique for phase-up of array antennas of regularly spaced lattice orientation, without the use of a nearfield or farfield range. The technique uses mutual coupling and/or reflections to provide a signal from one element to its neighbors. This signal provides a reference to allow for elements to be phased with respect to each other. After the first stage of the process is completed, the array is phased-up into, at most, four interleaved lattices. These interleaved lattices are then phased with respect to each other, thus completing the phase-up process.

13 Claims, 4 Drawing Sheets

SELF-PHASE UP OF ARRAY ANTENNAS WITH NON-UNIFORM ELEMENT MUTUAL COUPLING AND ARBITRARY LATTICE ORIENTATION

This invention was made with Government support under Contract awarded by the Government. The Government has certain rights in this invention.

TECHNICAL FIELD OF THE INVENTION

This invention relates to phased array antennas, and more particularly to an improved technique for calibrating the array elements to a known amplitude and phase.

BACKGROUND OF THE INVENTION

One of the most time and resource consuming steps in the making of an electronically scanned array antenna is the calibration of its elements with respect to each other. All of the elements across the array must be calibrated to a known amplitude and phase to form a beam. This process is referred to as array phase-up.

Conventional phase-up techniques typically require the use of external measurement facilities such as a nearfield range to provide a reference signal to each element in receive and to measure the output of each element in transmit. As all the elements must be operated at full power to provide the full transmit plane wave spectrum to sample, a great deal of energy is radiated during this testing. This dictates some implementation of high RF power containment, and carries with it a number of safety concerns. It would therefore be advantageous to provide a phase-up technique which minimizes the RF energy output.

Known array mutual coupling phase up techniques have been dependent on two dimensional symmetric lattice arrangements (equilateral triangular) and equal element mutual coupling responses in all lattice orientations. These are serious limitations since equilateral triangular lattice arrangements are not always used. Similarly, the element mutual coupling response is most often not equal in all lattice orientations.

SUMMARY OF THE INVENTION

This invention allows for the phase-up of array antennas without the use of a nearfield or farfield range. According to one aspect of the invention, only one element is used in a transmit state at a time, thus reducing the RF energy output. Mutual coupling and/or reflections are utilized to provide a signal from one element to its neighbors. This signal provides a reference to allow for elements to be phased with respect to each other. After the first stage of the process is completed, the array is phased-up into, at most, four interleaved lattices. The invention also provides for a way of phasing the interleaved lattices with respect to each other, thus completing the phase-up process. This technique works with any general, regularly spaced, lattice orientation. The technique is applicable to both transmit and receive calibrations.

Thus, in accordance with one aspect of the invention, a method for achieving phase-up of the radiative elements comprising an array antenna, wherein the elements are arranged in a plurality of spaced, interleaved lattices, comprising the steps of:

(i) transmitting a measurement signal from only a single element of a first interleaved lattice at a time, receiving the transmitted measurement signal at one or more adjacent elements of a second interleaved lattice, and computing phase and gain differences between elements of the second interleaved lattice as a result of transmission from the single elements of the first lattice;

(ii) repeating step (i) to sequentially transmit measurement signals from other elements of the first lattice and receiving the transmitted signals at elements of the second lattice, computing resulting phase and gain differences, and using the computed phase and gain differences to compute a first set of correction coefficients that when applied to corresponding elements of the second lattice permit these elements to exhibit the same phase and gain response and thereby provide a phased-up second lattice;

(iv) for each of the remaining lattices of elements, repeating step (i), (ii) and (iii) to provide a plurality of interleaved, phased-up lattices;

(v) determining a set of ratios of element mutual coupling coefficients for the array; and (vi) using the set of ratios of element mutual coupling coefficients to determine necessary adjustments to elements comprising said array to bring the plurality of interleaved lattices into phase, wherein phase-up of the array is achieved by transmitting signals through only one element at any given time.

In accordance with another aspect of the invention, a method for achieving phase-up of the radiative elements comprising an array antenna, wherein the elements are arranged in a rhombic lattice, comprises the steps of:

(i) dividing the array into first and second interleaved lattices of elements arranged in respective rows and columns;

(ii) for the first lattice, transmitting from a single element, receiving the transmitted signal at four adjacent, elements in the second lattice, and adjusting three of the receive elements to minimize the difference between their respective, received signals and the signal received at the remaining, fourth element of the four receive elements;

(iii) repeating step (ii) for each of the other elements in the first lattice to phase up all of the elements within the second lattice;

(iv) for the second lattice, transmitting from a single element, receiving the transmitted signal at four adjacent, elements in the first lattice, and adjusting three of the receive elements to minimize the difference between their respective, received signals and the signal received at the remaining, fourth element of the four receive elements;

(v) repeating step (iv) for each of the other elements in the second lattice to phase up all of the elements within the first lattice;

(vi) determining a set of ratios of element mutual coupling coefficients for the array; and (vi) using the set of ratios of element mutual coupling coefficients to determine necessary adjustments to elements comprising the array to bring the first and second interleaved lattices into phase, wherein phase-up of the array is achieved by transmitting signals through only one element at any given time.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1A:
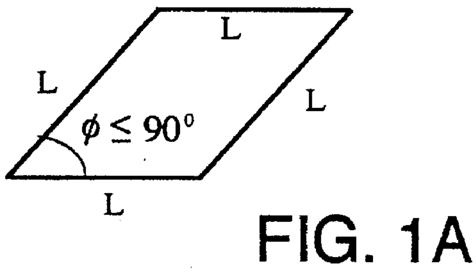
FIGS. 1A–1D illustrate, respectively, four quadrilateral configurations representing array element lattice positions.
Figure 1B:
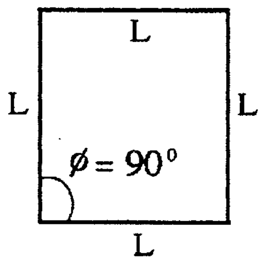
Figure 1C:
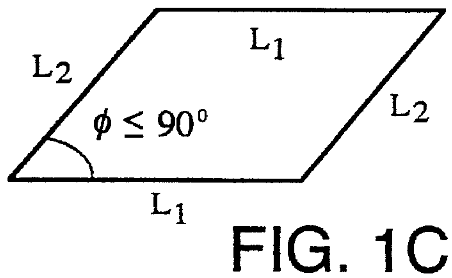
Figure 1D:
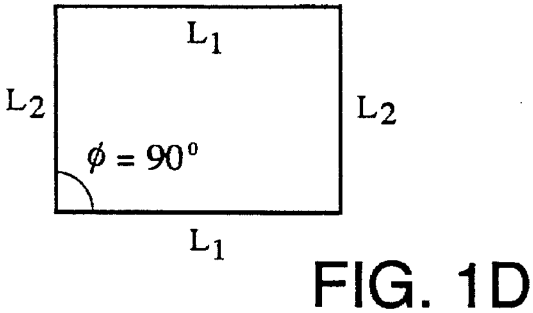

This invention involves a method for calibrating the array antenna elements to a known amplitude and phase. There are various one and two dimensional array configurations. The elements are generally disposed in accordance with a linear (one dimensional) or a two dimensional polygon configuration. A rhombus is a quadrilateral with equal length saides and opposite sides parallel, as indicated in FIG. 1A. A square is a special case of a rhombus wherein the angle between any adjacent sides is 90 degrees (FIG. 1B). A parallelogram is a quadrilateral with opposite sides parallel (FIG. 1C). A rectangle is a special case of a parallelogram where the angle between adjacent sides is 90 degrees (FIG. 1D) The corners of these quadrilaterals represent array element lattice positions in exemplary array configurations. For purposes of describing the invention, the case of the linear array will be first discussed, with subsequent discussion of the rhombic and parallelogram cases.

1. Calibrating an Array of Elements Arranged in a Line Array.

The following description of the sequence and steps for calibrating an array of elements in a line array is by way of example only. The same phase up goals can be accomplished through many possible sequences. Other sequences may be more optimal in terms of overall measurement time or, perhaps, measurement accuracy.

Figure 2A:
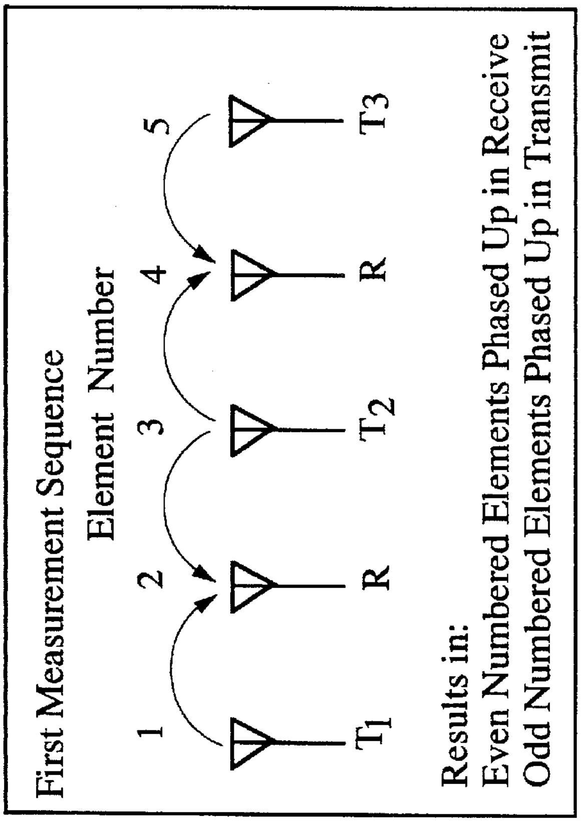
FIG. 2A illustrates the technique of phasing up the even and odd interleaved lattices of a linear array of elements in receive and transmit, respectively.

Even Element Receive Phase-Up. The first series of measurements are aimed at phasing up the even numbered elements operating in receive and the odd numbered elements while transmitting. FIG. 2A shows a line array comprising elements 1–5. The sequence begins by transmitting from element 1 as shown in FIG. 2A as transmission $T_1$, and simultaneously receiving a measurement signal R in element 2. A signal $T_2$ is then transmitted from element 3, and a measurement signal is received in element 2. The phase and gain response from element 2 in this case (reception of the transmitted signal from element 3) is compared to that for the previous measurement (reception of the transmitted signal from element 1). This allows the transmit phase/gain differences between elements 1 and 3 to be computed. While still transmitting from element 3, a receive measurement is then made through element 4. The differences in receive phase/gain response for elements 2 and 4 can then be calculated.

To finish the example depicted in FIG. 2A, a signal $T_3$ is transmitted from element 5 and a receive signal is measured in element 4. Data from this measurement allows element 5 transmit phase/gain coefficients to be calculated with respect to transmit excitations for elements 1 and 3.

The result of this series of measurements is computation of correction coefficients that when applied allow elements 2 and 4 to exhibit the same receive phase/gain response. Further, additional coefficients result that when applied, allow elements 1, 3 and 5 to exhibit the same transmit phase/gain response. Typically, the coefficients can be applied through appropriate adjustment of the array gain and phase shifter commands, setting attenuators and phase shifters.

In a line array of arbitrary extent, the measurement sequences of transmitting from every element and making receive measurements from adjacent elements continues to the end of the array. Thus the calibration technique can be applied to arbitrarily sized arrays. Receive measurements using elements other than those adjacent to the transmitting elements may also be used. These additional receive measurements can lead to reduced overall measurement time and increased measurement accuracy.

Figure 2B:
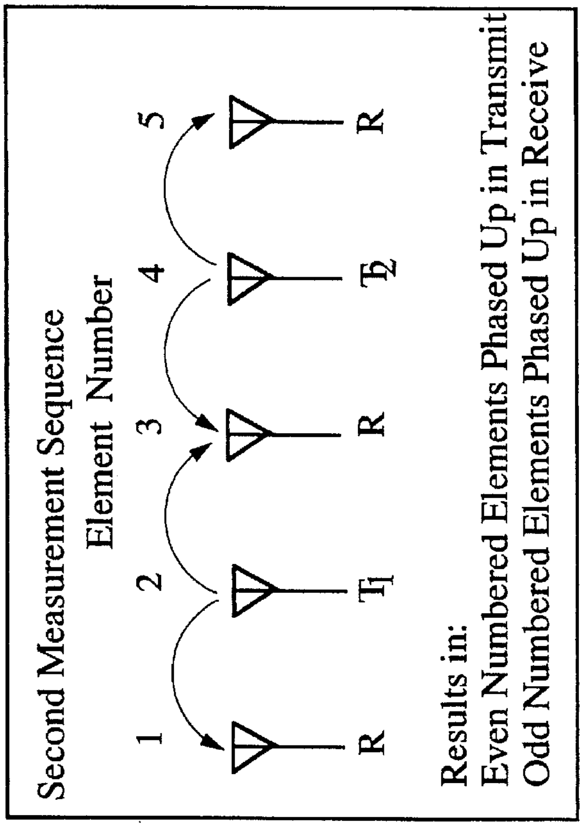
FIG. 2B illustrates the technique of phasing up the even and odd lattices in transmit and receive, respectively.

Odd Element Receive Phase-up. The second series of measurements is aimed at phasing up the odd numbered elements in receive and even numbered elements in transmit. These measurement sequences are similar to those described above for the even element phase-up, and are illustrated in FIG. 2B.

First, a transmit signal from element 2 provides excitation for receive measurements from element 1 and then element 3. This allows the relative receive phase/gain responses of elements 1 and 3 to be calculated.

A transmit signal from element 4 is then used to make receive measurements from element 3 and then element 5. This allows the relative receive phase/gain response of elements 3 and 5 to be calculated. Also, the relative transmit response of element 4 with respect to element 2 can be calculated. All of the coefficients can then be used to provide a receive phase-up of the even elements and a transmit phase-up of the odd elements.

To complete the overall phase-up, the interleaved phased-up odd-even elements need to be brought into overall phase/gain alignment. The following section describes a technique to determine coefficients that when applied achieve this.

Determining the ratio of coupling coefficients along a line array.

The technique previously described allows for the phasing of the interleaved lattices with phase/gain references unique for each of the interleaved lattices. In order to achieve the overall phase up objective, the differences in phase/gain references for the interleaved lattices must be measurable. A technique to achieve the overall phase up goal is now described. A linear array is used as an example, since it most simply demonstrates a technique applicable to the general two-dimensional array, with two interleaved lattices, the odd/even lattices. The ratio of coefficients determined from the following allows for the phasing of two lattices together.

Figure 3:
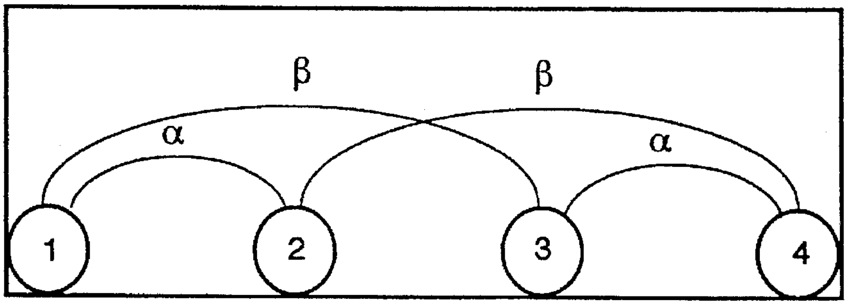
FIG. 3 illustrates four exemplary elements of a line array.

FIG. 3 illustrates a four element segment of a line array. The coupling paths are indicated by α and β.

A mutually coupled signal s includes three complex-valued components:

A transmit transfer function $A_T e^{j\phi T}$

A coupling coefficient $A_c e^{j\phi c}$

A receive transfer function $A_R e^{j\phi R}$ $$s = A_T e^{j\phi T} \cdot A_c e^{j\phi c} \cdot A_R e^{j\phi R}$$

Define:

T as a transmitted signal

R as a received signal

α as the adjacent-element coupling path

β as the alternating-element coupling path

The first step is to measure the two signals $s_1$ and $s_2$, with the excitation provided by transmitting from element 1 and receiving in elements 2 and 3. Transmitting from element 1 and receiving in element 2 is described in eq. 1. Transmitting from element 1 and receiving in element 3 is described in eq. 2. The next step is to measure the two signals $s_3$ and $s_4$ with excitation provided by transmitting from element 4 and receiving in elements 2 and 3. Transmitting from element 4 and receiving in element 3 is described by eq. 3. Transmitting from element 4 and receiving in element 2 is described by equation 4.

$$s_1 = A_{T_1}e^{j\phi_{T1}} \cdot A_\alpha e^{j\phi_\alpha} \cdot A_{R_2}e^{j\phi_{R2}} \quad \text{eq. 1}$$

$$s_2 = A_{T_1}e^{j\phi_{T1}} \cdot A_\beta e^{j\phi_\beta} \cdot A_{R_3}e^{j\phi_{R3}} \quad \text{eq. 2}$$

$$s_3 = A_{T_4}e^{j\phi_{T4}} \cdot A_\alpha e^{j\phi_\alpha} \cdot A_{R_3}e^{j\phi_{R3}} \quad \text{eq. 3}$$

$$s_4 = A_{T_4}e^{j\phi_{T4}} \cdot A_\beta e^{j\phi_\beta} \cdot A_{R_2}e^{j\phi_{R2}} \quad \text{eq. 4}$$

Next, the ratios of the signals, $s_1/s_2$ and $s_4/s_3$ are formed.

$$\frac{s_1}{s_2} = \frac{A_\alpha e^{j\phi_\alpha} \cdot A_{R_2}e^{j\phi_{R2}}}{A_\beta e^{j\phi_\beta} \cdot A_{R_3}e^{j\phi_{R3}}} \quad \text{eq. 5}$$

$$\frac{s_4}{s_3} = \frac{A_\beta e^{j\phi_\beta} \cdot A_{R_2}e^{j\phi_{R2}}}{A_\alpha e^{j\phi_\alpha} \cdot A_{R_3}e^{j\phi_{R3}}} \quad \text{eq. 6}$$

Finally, the desired ratio of the ratios is formed to calculate the ratio of the coupling coefficients, z.

$$\frac{\frac{s_1}{s_2}}{\frac{s_4}{s_3}} = \frac{\frac{A_\alpha e^{j\phi_\alpha} \cdot A_{R_2}e^{j\phi_{R2}}}{A_\beta e^{j\phi_\beta} \cdot A_{R_3}e^{j\phi_{R3}}}}{\frac{A_\beta e^{j\phi_\beta} \cdot A_{R_2}e^{j\phi_{R2}}}{A_\alpha e^{j\phi_\alpha} \cdot A_{R_3}e^{j\phi_{R3}}}} = \left[\frac{(A_\alpha e^{j\phi_\alpha})}{(A_\beta e^{j\phi_\beta})}\right]^2 = z^2 \quad \text{eq. 7}$$

The determination of the ratio of coupling coefficients can be determined at near arbitrary locations in an array. This extension can be used to remove the effects of non-uniformities in array element coupling coefficients as needed.

Applying the coupling coefficient ratio to phase interleaved lattices together.

Using measured signal values $s_1$ and $s_2$ used in the determination of z:

$$s_2 = A_{T_1}e^{j\phi_{T1}} \cdot A_\beta e^{j\phi_\beta} \cdot A_{R_3}e^{j\phi_{R3}} \quad \text{eq. 8}$$

$$s_1 = A_{T_1}e^{j\phi_{T1}} \cdot A_\alpha e^{j\phi_\alpha} \cdot A_{R_2}e^{j\phi_{R2}} \quad \text{eq. 9}$$

It will be seen that eq. 8 and eq. 9 are the same as eq. 2 and eq. 1, respectively.

The amount Δ that element 3 must be adjusted to equal element 2 can be calculated as the ratio of $s_2 \cdot z$ and $s_1$.

$$\Delta = \frac{A_{T_1}e^{j\phi_{T1}} \cdot A_\beta e^{j\phi_\beta} \cdot A_{R_3}e^{j\phi_{R3}}\left[\frac{(A_\alpha e^{j\phi_\alpha})}{(A_\beta e^{j\phi_\beta})}\right]}{A_{T_1}e^{j\phi_{T1}} \cdot A_\alpha e^{j\phi_\alpha} \cdot A_{R_2}e^{j\phi_{R2}}} = \frac{A_{R_3}e^{j\phi_{R3}}}{A_{R_2}e^{j\phi_{R2}}} \quad \text{eq. 10}$$

Applying this correction and the correction for the difference in coupling paths, it will be seen that the interleaved lattices are brought into phase with use of the couupling coefficients.

$$s_1 \cdot \Delta / Z = s_2$$

Thus, the ratio of coupling coefficients can be used to bring the interleaved lattices into phase.

2. Calibrating a General Rhombic Lattice.

The general principals of interleaved lattice phase-up and coupling ratio measurement can be applied to all parallelogram lattices. The procedure is simplified if additional structure, such as a rhombic lattice, exists.

Calibrating Alternating Columns.

The example technique described herein applies to rhombic lattices. Without loss of generality, a triangular lattice example will be described. Square lattices are just a rotated version of this example.

The following discussion is one of a receive calibration. The technique is applicable to transmit if the roles of the transmit and receive elements are reversed.

Figure 4:
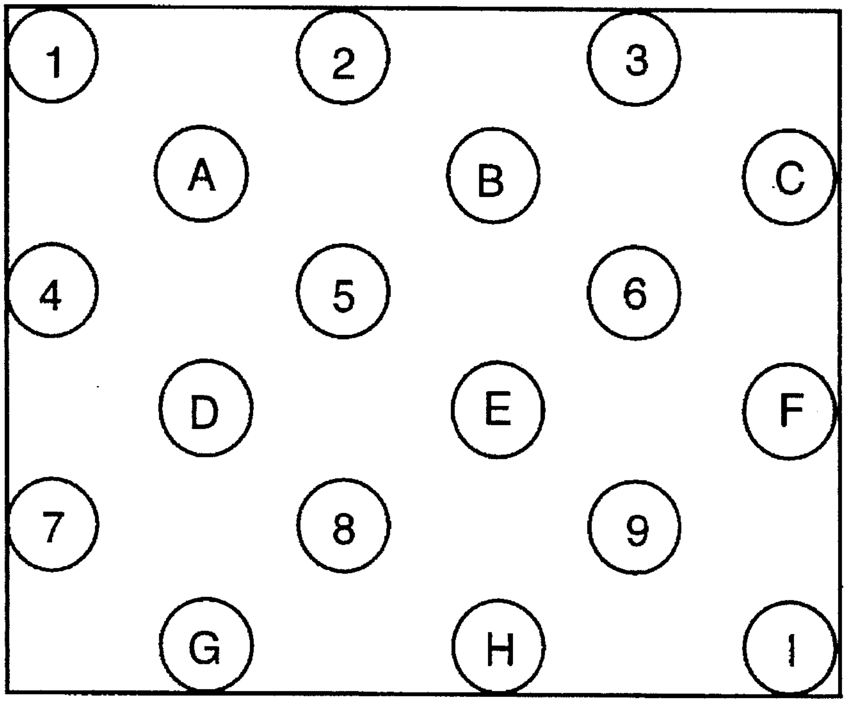
FIG. 4 is a simplified schematic diagram illustrating a rhombic lattice configuration of an array.

In the following discussion, FIG. 4 is a graphical depiction of the element positions.

The process begins by transmitting out of element A. Signals are received, one at a time, through elements 1, 2, 4, and 5. Due to the 2-plane symmetry of the mutual coupling, the coupling coefficient from A to 1, 2, 4, and 5 is the same. The elements 2, 4 and 5 can be adjusted to minimize the difference between their returned signals and the signal from element 1. Applying this adjustment brings elements 1, 2, 4 and 5 into phase.

Next, a signal is transmitted out of element B. Elements 3 and 6 are adjusted so that the difference between their individual signals and the signals from the previously adjusted elements 2 or 5 is minimized. This brings elements 1, 2, 3, 4, 5, and 6 into phase.

The process above is repeated until all of the numbered elements are brought into phase with respect to each other.

The above process is then repeated with the role of the transmitting and receiving elements reversed. A signal is transmitted out of element 5, and elements A, B, D, and E are brought into phase. A signal is then transmitted out of element 6, and elements C and F are added to A, B, D, and E as being in phase. The process is repeated until all of the lettered elements are brought into phase with each other.

The next step is to bring these two interleaved lattices into phase.

Phasing the Two Interleaved Lattices.

Figure 5:
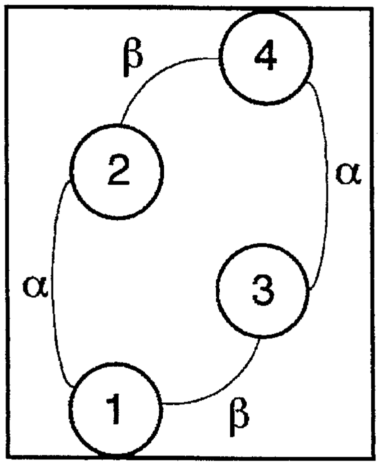
FIG. 5 illustrates the coupling paths of four elements of the rhombic array of FIG. 4.

The procedure described below allows for the self-contained measurement of the ratio of the coupling coefficients α and β described in FIG. 5. This ratio of coefficients is sufficient to allow for the phasing of the two lattices together. This process is comparable to determination of the ratio of coupling coefficients along a line array described previously.

Determining the Ratio of Coupling Coefficients Along a Rhombic Lattice.

A mutually coupled signal s is comprised of three complex-valued components:

A transmit transfer function $A_T e^{j\phi T}$

A coupling coefficient $A_c e^{j\phi c}$

A receive transfer function $A_R e^{j\phi R}$ $s = A_T e^{j\phi T} \cdot A_c e^{j\phi c} \cdot A_R e^{j\phi R}$ Define:

T as a transmitted signal

R as a received signal

α as the adjacent-element coupling path

β as the alternating-element coupling path

The first step is to measure the four signals $s_1$, $s_2$, $s_3$ and $s_4$.

$$s_1 = A_{T_1} e^{j\phi T_1} \cdot A_\alpha e^{j\phi\alpha} \cdot A_{R_2} e^{j\phi R_2} \quad \text{eq. 13}$$

$$s_2 = A_{T_1} e^{j\phi T_1} \cdot A_\beta e^{j\phi\beta} \cdot A_{R_3} e^{j\phi R_3} \quad \text{eq. 14}$$

$$s_3 = A_{T_4} e^{j\phi T_4} \cdot A_\alpha e^{j\phi\alpha} \cdot A_{R_3} e^{j\phi R_3} \quad \text{eq. 15}$$

$$s_4 = A_{T_1} e^{j\phi T_4} \cdot A_\beta e^{j\phi\beta} \cdot A_{R_2} e^{j\phi R_2} \quad \text{eq. 16}$$

Next, the ratios of the signals, $s_1/s_2$ and $s_4/s_3$ are formed.

$$\frac{s_1}{s_2} = \frac{A_\alpha e^{j\phi\alpha} \cdot A_{R_2} e^{j\phi R_2}}{A_\beta e^{j\phi\beta} \cdot A_{R_3} e^{j\phi R_3}} \quad \text{eq. 17}$$

Finally, the ratio of the ratios is formed to calculate the ratio of the coupling coefficients.

$$\frac{S_4}{S_3} = \frac{A_\beta e^{j\phi\beta} \cdot A_{R_2} e^{j\phi R_2}}{A_\alpha e^{j\phi alpja} \cdot A_{R_3} e^{j\phi R_3}}$$

$$\frac{\frac{s_1}{s_2}}{\frac{s_4}{s_3}} = \frac{\frac{A_\alpha e^{j\phi\alpha} \cdot A_{R_2} e^{j\phi R_2}}{A_\beta e^{j\phi\beta} \cdot A_{R_3} e^{j\phi R_3}}}{\frac{A_\beta e^{j\phi\beta} \cdot A_{R_2} e^{j\phi R_2}}{A_\alpha e^{j\phi\alpha} \cdot A_{R_3} e^{j\phi R_3}}} = \left(\frac{(A_\alpha e^{j\phi\alpha}}{A_\beta e^{j\phi\beta}}\right)^2 = z^2 \quad \text{eq. 19}$$

The ratio z is the desired coupling coefficient ratio.

Applying the Coupling Coefficient Ratio To Phase the Interleaved Lattices Together.

Using the same notation for elements and coupling paths, the following signals are collected.

$$s_2 = A_{T_1} e^{j\phi T_1} \cdot A_\beta e^{j\phi\beta} \cdot A_{R_3} e^{j\phi R_3} \quad \text{eq. 20}$$

$$s_1 = A_{T_1} e^{j\phi T_1} \cdot A_\alpha e^{j\phi\alpha} \cdot A_{R_2} e^{j\phi R_2} \quad \text{eq. 21}$$

The amount that element 3 must be adjusted to equal element 2 in a complex sense is equal to the ratio of $s_2 \cdot z$ and $s_1$.

$$\Delta = \frac{s_2 \cdot z}{s_1} = \frac{A_{T_1} e^{j\phi T_1} \cdot A_\beta e^{j\phi\beta} A_{R_3} e^{j\phi R_3} \cdot \frac{A_\alpha e^{j\phi\alpha}}{A_\beta e^{j\phi\beta}}}{A_{T_1} e^{j\phi T_1} \cdot A_\alpha e^{j\phi\alpha} \cdot A_{R_2} e^{j\phi R_2}} = \frac{A_{R_3} e^{j\phi R_1}}{A_{R_2} e^{j\phi R_2}} \quad \text{eq. 22}$$

Applying this correction plus the correction for the difference in coupling paths, it will be seen that the signals below are equal.

$s_1 \cdot \Delta / z = s_2$

This completes the lattice phase-up.

3. Calibrating a General Parallelogram Lattice.

Calibration Into Interleaved Lattices. The technique described herein applies to general parallelogram lattices. Square, rhombic, rectangular, and parallelogram lattices are just cases of a general parallelogram. For explanation purposes, and without loss of generality, a parallelogram lattice example is described.

Figure 6:
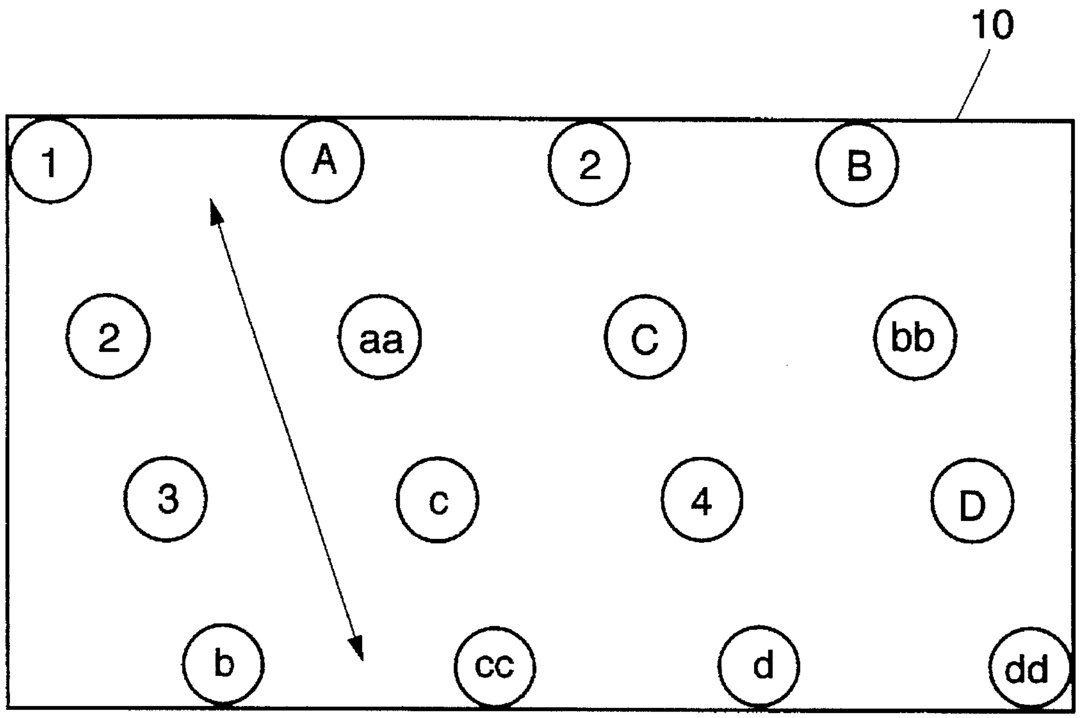
FIG. 6 is a graphical depiction of the element positions in a parallelogram array lattice.

FIG. 6 is a graphical depiction of the element positions in a parallelogram lattice 10. The discussion from here on is one of a receive calibration. The technique is applicable to transmit calibration if the roles of the transmit and receive elements are reversed.

Step 1: The process begins by transmitting out of element a. Signals are received one at a time through elements 1 and 3. Due to the symmetry of the mutual coupling, the coupling coefficient from element a to element 1 and from element 1 to element 3 is the same. Element 3 can be adjusted to minimize the phase and gain difference between its returned signal and the signal from element 1. Applying this adjustment through an array calibration system allows elements 1 and 3 to exhibit the same phase and gain excitation.

Step 2: Next, a signal is transmitted out of element c. Element 4 is adjusted so that the difference between its signal and the signal from element 2 is minimized. This brings elements 2 and 4 into phase.

Step 3: Next, a signal is transmitted out of element A. Element 2 is adjusted to minimize the difference in its signal and the signal from element 1. The same adjustment is applied to the already adjusted element 4. This brings elements 1, 2, 3 and 4 into phase.

Step 4: By repeating this process, alternating elements in alternating columns are brought into phase.

Steps 1–4 are repeated using transmissions from elements 3, 4 and aa to bring elements a, b, c and d into phase. The steps 1–4 are again repeated using transmissions from aa, bb and 2 to bring elements, A, B, C, and D into phase. The steps 1–4 are repeated one last time using transmissions from elements C, D, and c to bring elements aa, bb, cc and dd into phase.

Four interleaved, phased-up lattices have now been formed. The next step is to bring these four interleaved lattices into phase through determination of the ratio of element mutual coupling coefficients in the necessary, specific orientations.

The parallelogram lattice is the most complex, with four interleaved lattices. Other lattices exhibit fewer interleaved lattices, i.e. two lattices for both the rhombic and line arrays.

Using the line array phase-up technique to phase the four interleaved lattices.

The previous technique for phasing up a line array is applied three times to the general parallelogram lattice. After completing the four-lattice phase up step above, the following groups of elements as depicted in FIG. 1 are in phase with respect to each other: (1, 2, 3, 4); (a, b, c, d); (A, B, C, D), and (aa, bb, cc, dd). The line array phase-up technique above is first applied to elements A, aa, C, and cc. Using this technique allows elements A, B, C, D, aa, bb, cc and dd to be phased together. The process is then repeated with elements 2, c, 4, and d. This allows elements 1, 2, 3, 4, a, b, c, and d to be phased up. The process is repeated one last time using elements 3, C, 4, and D. This final step pulls all elements into phase.

The invention provides several advantages over other phase-up methods. When compared to nearfield phase-up techniques, the invention allows for array phase-up with a minimal amount of external equipment or facilities. Further, the method allows for asymmetries in lattice and element mutual coupling patterns. Other techniques are dependent on equal inter-element path length and equal element mutual coupling responses in all neighboring lattice orientations. The invention alleviates the need for external measurement of the difference in element mutual coupling paths.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for achieving phase-up of the radiative elements comprising an array antenna, wherein the elements are arranged in a plurality of spaced, interleaved lattices, comprising the steps of:

(i) transmitting a measurement signal from only a single element of a first interleaved lattice at a time, receiving the transmitted measurement signal at one or more adjacent elements of a second interleaved lattice, and computing phase and gain differences between elements of the second interleaved lattice as a result of transmission from the single elements of the first lattice;

(ii) repeating step (i) to sequentially transmit measurement signals from other elements of said first lattice and receiving the transmitted signals at elements of the second lattice, computing resulting phase and gain differences, and using the computed phase and gain differences from steps (i) and (ii) to compute a first set of correction coefficients that when applied to corresponding elements of the second lattice permit these elements to exhibit the same phase and gain response and thereby provide a phased-up second lattice;

(iii) for each of the remaining lattices of elements, repeating steps (i) and (ii) to provide a plurality of interleaved, phased-up lattices;

(iv) determining a set of ratios of element mutual coupling coefficients for said array; and (v) using the set of ratios of element mutual coupling coefficients to determine necessary adjustments to elements comprising said array to bring the plurality of interleaved lattices into phase, wherein phase-up of said array is achieved by transmitting signals through only one element at any given time.

2. The method of claim 1 wherein the lattice orientation is a quadrilateral orientation.

3. The method of claim 2 wherein the quadrilateral orientiation is a parallelogram, and wherein the array comprises four interleaved lattices which are brought into phase.

4. The method of claim 1 wherein the array is a linear array of first and second interleaved arrays of alternating elements.

5. The method of claim 4 wherein the set of ratios of element mutual coupling coefficients comprises ratios of coupling coefficients between adjacent and alternating elements comprising said array.

6. A method for achieving phase-up of the radiative elements comprising an array antenna, wherein the elements are arranged in a regularly spaced, lattice orientation, comprises the steps of:

(i) dividing the array into a plurality of interleaved lattices of elements arranged in respective rows and columns;

(ii) for a given one of the lattices of elements, transmitting from a single element at a time, receiving the transmitted signal at two adjacent elements, and adjusting one of the receive elements to minimize the difference between its received signal and the signal received at the other of the two receive elements;

(iii) repeating step (ii) for each of the other elements in the given one of the lattices of elements to phase up all of the elements within the given lattice;

(iv) for each of the remaining lattices of elements, repeating steps (ii) and (iii) to provide a plurality of interleaved, phased-up lattices;

(v) determining a set of ratios of element mutual coupling coefficients for the array; and (vi) using the set of ratios of element mutual coupling coefficients to determine necessary adjustments to elements comprising said array to bring the plurality of interleaved lattices into phase, wherein phase-up of the array is achieved by transmitting signals through only one element at any given time.

7. The method of claim 6 wherein the lattice orientation is a quadrilateral orientation.

8. The method of claim 7 wherein the quadrilateral orientiation is a parallelogram, and wherein the array comprises four interleaved lattices which are brought into phase.

9. The method of claim 6 wherein the set of ratios of element mutual coupling coefficients comprises ratios of coupling coefficients between adjacent and alternating elements comprising said array.

10. A method for achieving phase-up of the radiative elements comprising an array antenna, wherein the elements are arranged in a rhombic lattice, comprising the steps of:

(i) dividing the array into first and second interleaved lattices of elements arranged in respective rows and columns;

(ii) for said first lattice, transmitting from a single element at a time, receiving the transmitted signal at four adjacent, elements in said second lattice, and adjusting three of the receive elements to minimize the difference between their respective, received signals and the signal received at the remaining, fourth element of the four receive elements;

(iii) repeating step (ii) for each of the other elements in the first lattice to phase up all of the elements within said second lattice;

(iv) for said second lattice, transmitting from only a single element, receiving the transmitted signal at four adjacent, elements in said first lattice, and adjusting three of the receive elements to minimize the difference between their respective, received signals and the signal received at the remaining, fourth element of the four receive elements;

(v) repeating step (iv) for each of the other elements in the second lattice to phase up all of the elements within said first lattice;

(vi) determining a set of ratios of element mutual coupling coefficients for said array; and (vi) using the set of ratios of element mutual coupling coefficients to determine necessary adjustments to elements comprising said array to bring the first and second interleaved lattices into phase, wherein phase-up of said array is achieved by transmitting signals through only one element at any given time.

11. The method of claim 10 wherein the rhombic lattice is a square lattice.

12. The method of claim 10 wherein the rhombic lattice is a triangular lattice.

13. The method of claim 10 wherein the set of ratios of element mutual coupling coefficients comprises ratios of coupling coefficients between adjacent and alternating elements comprising said array.

* * * * *